(12) United States Patent
Knott et al.

(10) Patent No.: US 7,080,323 B2
(45) Date of Patent: Jul. 18, 2006

(54) DYNAMIC AND ADAPTABLE SYSTEM AND METHOD FOR SELECTING A USER INTERFACE DIALOGUE MODEL

(75) Inventors: Benjamin A. Knott, Round Rock, TX (US); Robert R. Bushey, Cedar Park, TX (US)

(73) Assignee: SBC Properties, L.P., Reno, NV (US)

(*) Notice: Subject to any disclaimer, the term of this patent is extended or adjusted under 35 U.S.C. 154(b) by 827 days.

(21) Appl. No.: 10/263,552

(22) Filed: Oct. 3, 2002

(65) Prior Publication Data

US 2004/0066416 A1 Apr. 8, 2004

(51) Int. Cl.
*G06F 3/00* (2006.01)
*G06F 3/16* (2006.01)
*H04M 3/487* (2006.01)
*G06F 19/00* (2006.01)

(52) U.S. Cl. ............ 715/747; 715/744; 715/727; 715/866; 715/978; 379/265.02; 379/265.11; 379/265.13; 379/88.14; 379/93.09; 379/93.11

(58) Field of Classification Search ............ 715/747, 715/744, 745, 866, 727, 728, 978, 740; 379/265.01, 379/265.02, 265.08, 265.11, 265.13, 88.08, 379/88.14, 93.05, 93.06, 93.09, 93.11, 917; 705/1, 8

See application file for complete search history.

(56) References Cited

U.S. PATENT DOCUMENTS

| | | | |
|---|---|---|---|
| 5,867,562 A | 2/1999 | Scherer | 379/88 |
| 6,070,142 A * | 5/2000 | McDonough et al. | 705/8 X |
| 6,101,486 A | 8/2000 | Roberts et al. | 705/27 |
| 6,170,011 B1 | 1/2001 | Beck et al. | 709/224 |
| 6,188,751 B1 | 2/2001 | Scherer | 379/88.22 |
| 6,332,154 B1 | 12/2001 | Beck et al. | 709/204 |
| 6,370,508 B1 | 4/2002 | Beck et al. | 705/1 |
| 6,373,939 B1 | 4/2002 | Reese et al. | 379/266.1 |
| 6,744,877 B1 * | 6/2004 | Edwards | 379/265.02 |
| 6,751,591 B1 * | 6/2004 | Gorin et al. | 379/88.01 X |
| 6,798,876 B1 * | 9/2004 | Bala | 379/265.02 X |
| 6,850,949 B1 * | 2/2005 | Warner et al. | 379/88.18 X |
| 2002/0037073 A1 | 3/2002 | Reese et al. | |

* cited by examiner

*Primary Examiner*—Raymond J. Bayerl
(74) *Attorney, Agent, or Firm*—Baker Botts L.L.P.

(57) ABSTRACT

A communication system includes a selection module for selecting appropriate user interface types for nodes within a task. The selection module interacts with a selection criteria library and a user interface dialogue model library to determine an appropriate user interface. Selection criteria library and user interface dialogue model library may be selectively and dynamically adapted to reflect environmental, customer and organization changes.

20 Claims, 3 Drawing Sheets

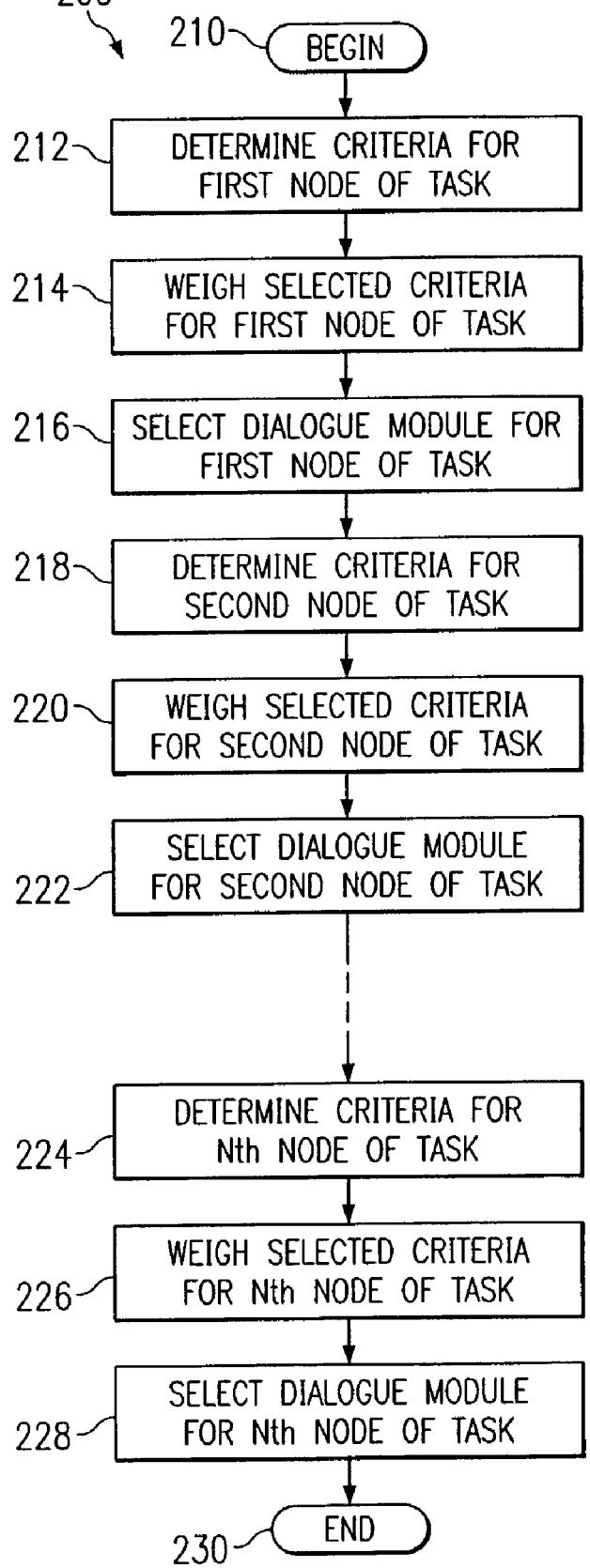

DYNAMIC AND ADAPTABLE SYSTEM AND METHOD FOR SELECTING A USER INTERFACE DIALOGUE MODEL

TECHNICAL FIELD OF THE INVENTION

The present invention relates in general to communication systems and more particularly to an adaptable system and method for selecting a user interface dialogue model.

BACKGROUND OF THE INVENTION

Customers contact organizations such as telecommunications companies in order to accomplish tasks including ordering a service, requesting repair service, or asking questions about their bill. When a customer contacts the organization, the customer's call is connected to a user interface which may be a customer service representative or any of a number of automated systems. Currently, when designing a system for communicating with customers, the determination of the type interface or dialogue model a customer will interact with is decided at an early stage within the design of the communication system. Typically, designers choose a primary interface, such as a speech directed dialogue interface, and a secondary or back-up interface, such as a touch tone interface, in case the primary interface fails.

As a communication system changes over time, the existing dialogue model is often ill suited for newly added tasks. However, the existing dialogue model is often maintained because redesigning the system to incorporate a new dialogue model is prohibitively expensive. This may lead to a decrease in the effectiveness of the system as well as customer dissatisfaction and frustration.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 is a flow diagram of a method for selecting user interface dialogue models.

DETAILED DESCRIPTION OF THE INVENTION

Figure 1:
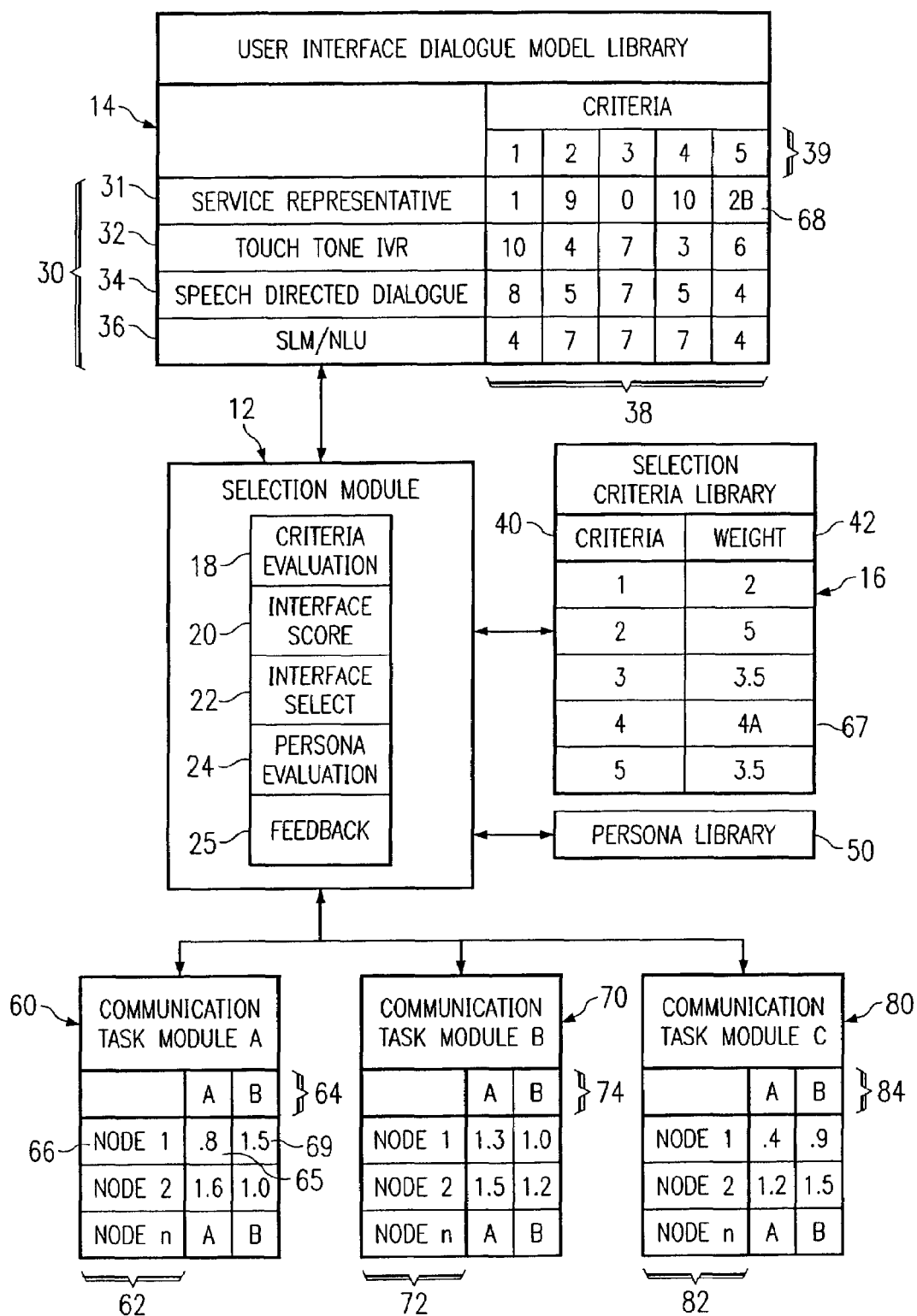
FIG. 1 is a depiction of a communication system including a selection module, user interface dialogue module library and selection criteria library according to the teachings of the present invention.
Figure 2:
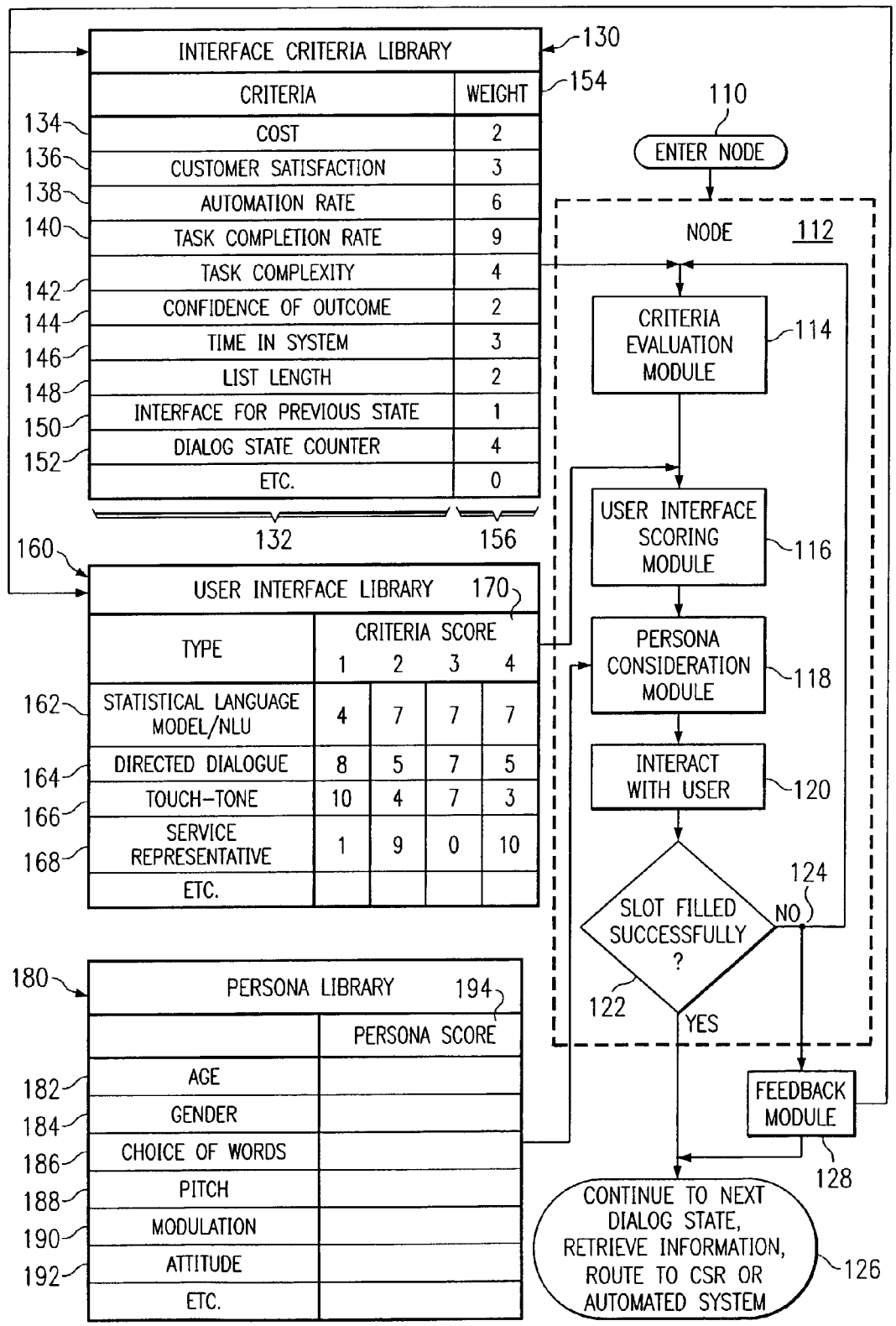
FIG. 2 shows a flow diagram of a user interface selection system according to the present invention.

Preferred embodiments and their advantages are best understood by reference to FIGS. 1 through 3, wherein like numbers are used to indicate like and corresponding parts.

Now, referring to FIG. 1, a communication system for communicating with customers, depicted generally at 10, is shown. Communication system 10 is preferably designed to receive communications from customers or other constituents of an organization. In the present embodiment, communication system 10 is designed to receive incoming communications from telecommunications customers on behalf of a telecommunications company.

Communication system 10 includes selection module 12 which is operably connected with both user interface dialogue model 14 and selection criteria library 16. Persona library 50 as well as a plurality of communication task modules such as module A, 60 module B, 70 and module C, 80 are also operably connected with selection module 12.

In the present embodiment, selection module 12 operates to select an appropriate user interface for a particular node of a communication task. Selection module 12 includes criteria evaluation module 18, interface scoring module 20, interface selection module 22, persona evaluation module 24 and feedback module 25. Selection module 12 is generally operable to communicate with selection criteria library 16 and user interface dialogue model library 14. User interface dialogue model library 14 is a database or other information storage means for storing information about a plurality of different user interface dialogue models 30 which may also be referred to as user interfaces or dialogue models. User interface dialogue model library 14 includes criteria scores 38 for each user interface type.

In the present embodiment, user interface dialogue model library 14 includes four user interface types: service representative 31, touch tone IVR 32, speech directed dialogue 34, and speech statistical language model/natural language understanding (SLM/NLU) 36. In the present embodiment, criteria scores 38 are listed for each individual user interface type and are also associated with a criteria number 39. Each criteria number 39 corresponds to a criteria 40 listed within selection criteria library 16.

Selection criteria library 16 is a database or other information storage means for storing information related to selection criteria for selecting a user interface type. Selection criteria library 16 includes a listing of a plurality of criteria 40 and associated criteria weight scores 42. Criteria 40 may include, for example, criteria such as cost, customer satisfaction, automation rate, task completion rate, task complexity, confidence of outcome, length of time in system, list length, interface used in previous state, and a dialogue state counter. These example criteria 40 are described in greater detail with respect to FIG. 2, below. Criteria weight 42 is an assigned valuation of the importance or weight given to each particular criteria 40. In the present embodiment, criteria weight 42 is dynamic and adaptable. Criteria weight 42 may be adapted, modified or changed to reflect changing environmental factors, changing customer factors, and changing organizational factors.

As an example, environmental factors may include background noise and cell phone (modality) use. High background noise may shift the VUI selection to one that operates better in high noise. Cell phone may shift the VUI selection to one that does not require keying information manually, but rather utilizes voice commands. Examples of customer factors include changing customer views and priorities generally and system-specific factors. General views and priorities may include, for instance, customer views on cost and customer service which may be gained from survey data or other similar data. System-specific trigger events such as increasing the weight of the "time in system" criteria if the average time a customer spends in the system exceeds a pre-selected average. An example of a changing organization factor may be that an organization may periodically change its goals with respect to factors such as cost and automation rate. In these instances, the criteria weights may be changed to reflect changes in an organization's goals or priorities.

Selection module 12 operates to select a proper user interface type from user interface dialogue model library 14 for anyone of the plurality of communication task modules 60, 70, or 80. Each communication task module such as communication task module A 60 includes a number of steps or nodes 62 required to complete the task. Each node may have associated therewith one or more variables 64. Variables 64 may be used to adjust the value of criteria weight 42 or criteria score 39 to reflect node-specific factors. One example of a node-specific factor that is used to adjust criteria weight 42 is list length. An example of where variable 64 may be used to adjust a criteria score is with respect to the time in system score related to a service representative 31 form of user interface because the time in system for such an interface will be directly affected by whether or not a customer service representative is available or whether the customer will be put on hold.

In operation, selection module 12 evaluates which user interface type 30 to use a particular communication task such as communication task module A 60. Selection module 12 first evaluates which user interface type 30 to use for the first node 62 or step within communication task module A 60. After successful completion of each node 62, selection module 12 evaluates and selects a user interface type for each successive node 62 within the communication task module. Criteria evaluation module 18 begins this process by retrieving criteria 40 and their associated criteria weights 42 from selection criteria library 16. Interface scoring module 20 then retrieves criteria scores 38 for each of the plurality of listed user interface dialogue models 30. Interface score module 20 then, for each user interface dialogue model 30, multiplies each criteria score 38 with each corresponding criteria weight 42 and adds the resulting values to determine an interface score. Interface selection module 22 then selects the user interface dialogue model that has the highest interface score. The communication node is then directed to the selected user interface dialogue model and proceeds until the completion of the current node of the communication task.

In some embodiments, interface scoring module 20 may incorporate one or more values such as variable value 65 associated with a node, such as node 66. Variable value 65 may then be factored into a criteria weight value 42 or a criteria score value 39. For example, interface scoring module 20 may multiply selected criteria weight 67 by variable 65. By multiplying the variable value with criteria weight 67, interface selection module 22 adjusts the criteria weight for node specific variables. As another example, interface scoring module 20 may incorporate variable value 69 as the criteria score for service representative 30 user interface type dialogue model. In this particular instance, variable 69 is a factor that represents the average time (using a moving average) in system for a call routed to a service representative. Accordingly, when there are not enough service representatives to handle incoming calls, and customers must be put on hold before they can speak to a customer service representative, this may be factored into the criteria score.

After selection module 12 selects a user interface type, persona evaluation module 24 may evaluate whether the selected user interface dialogue is appropriate for the particular call based on call-specific aspects known as persona. In particular, persona evaluation module 24 may be used to evaluate whether or not a specific call is appropriate for user interface types that include a voice recognition component such as a speech directed dialogue 34 or SLM/NLU 36. Persona library 50 contains call specific data, including data related to the caller's choice of words, the caller's pitch, modulation, and attitude. If persona evaluation module 24 determines that the selected user interface type is not appropriate for a particular call then persona evaluation module communicates with interface selection module 22 to select the user interface type with the next highest interface score. The process of persona evaluation 24 may then be repeated for the second selected user interface type.

Selection module 12 also includes feedback module 25. Feedback module 25 automatically provides feedback to the variables 64 associated with the communication task module 60, criteria weights 42, and criteria scores 38. For example, feedback module 25 operates to and keep track of the success rate and time lengths associated with the plurality of user interface types. Feedback module 25 may automatically adjust criteria weights 42, communication task variables 64 and criteria scores 38 to reflect the current state of the communication system 10. Feedback module 25 also allows a system administrator to manually adjust the criteria weight 42 and criteria scores 39 to reflect changing environmental factors, customer factors, and organizational factors.

For example, if the customer begins with a very broad topic, the speech SLM/NLU 36 style of "How May I help You/Speak Freely" would be utilized. However, if the environment has a lot of background noise, the Touch Tone 32 style would be utilized through operation of persona evaluation module 24. As the customer continues their interaction, the dialogue model could change from Speech Directed Dialogue 34 to a Service Representative 31. An important aspect of this invention is that the dialogue models may change dynamically as the behavior and goals of the customer becomes more evident, the task evolves, and the environmental situation changes.

This invention also allows for the dynamic update of the content of each dialogue model 30, based on user behavior and system performance. For example, a speech directed dialogue model 34 may be very effective for billing tasks, but is not effective for repair tasks. In this case, touch tone model 32 may be adapted to be more likely to be selected for nodes related to repair tasks and to include repair options in a more prominent location within the interface. This functionality helps ensure that each interface type is customer-centric.

Now referring to FIG. 2, a flow diagram of a communication system for selecting a user interface, depicted generally at 100, is shown. In operation, a particular node or dialogue state is begun within communication system 100 at 110. When the node is begun 112, criteria evaluation module 114 first considers criteria 132 stored within criteria library 130. Criteria 132, in the present embodiment, includes cost 134, customer satisfaction 136, automation rate 138, task completion rate 140, task complexity 142, confidence of outcome 144, time in system 146, list of length 148, VUI for previous state 150 and dialogue state counter 152. In an alternative embodiment, additional criteria may be listed within criteria library 130 and some of the criteria listed in the present embodiment may not be included.

Criteria library also includes a criteria weight 154 corresponding to each criteria 132. Criteria weight 154 reflects the relative weight or importance placed on each particular criteria. For instance, if an organization is attempting to keep costs low, the criteria weight 154 for the criteria of cost 134 would be set at a relative high valuation. In some embodiments, criteria weight 154 may be set at 0 for various criteria 132 effectively eliminating those criteria from consideration.

Cost 134 is a reflection of the cost of a particular interface type. For example, a service representative 168 is typically the most expensive form of user interface while a touch tone interface 166 is typically the least expensive form of user interface.

Customer satisfaction 136 is an indication of the degree to which callers, customers, or constituents are satisfied with the particular user interface. Automation rate 138 is an indication of the rate at which user interface selection is more for automated systems (such as a touch tone or directed dialogue system) versus non-automated systems (such as a service representative). Task completion rate 140 is the rate of successful completion of tasks by a particular user interface type. In a particular embodiment task completion rate 140 may be specific to the successful task completion rate of a particular user interface type to a particular node or a particular communication task module (as shown in FIG. 1).

Confidence of outcome 144 is an indication of the likelihood that a particular node will be successfully completed. Time in system 146 is a reflection of the average time a user interface type takes to complete a particular node. List length 148 is a node specific characteristic reflective of the number of list options associated with a particular node. Interface from previous state 150 is an indication of the user interface type that was used by the previous node. Dialogue state counter 152 is a counter to keep track of the number of times a user has used a particular dialogue state for a particular node. The dialogue state counter is intended to indicate when a user continues to fail to complete a task after several attempts using a particular user interface type.

The use of tasks broken down into nodes as well as dialogue state counter 152 helps the customer from "going backward" in the interaction. "Going backward" occurs when the interface style does not change and the customer fails in accomplishing their task with a particular style (for whatever reason), and the customer may have to repeat information. In other words, the customer may be asked to re-enter information that they previously provided. With this invention, the library provides a dialogue model knowing the current state of information.

Criteria evaluation module 114 retrieves the criteria 132 and corresponding weights 154 as described with respect to criteria valuation module 18 shown in FIG. 1. Next, user interface scoring module 116 interacts with user interface library 160. User interface library 160 includes criteria weight information for a plurality of user interface types. In the present embodiment the user interface types include statistical language model 162, directed dialogue model 164, touch tone model 166, and service representative 168. In an alternative embodiment, additional user interface types may be included and less than all the current user interface types may be included. The present invention encompasses web-based and wireless web-based user interface types.

Criteria scores 170 are particular to each user interface type and a criteria score corresponding to each criteria 132 listed within criteria library 130 is preferably maintained. Criteria scores 170 are preferably a relative reflection of the strength of each particular interface type with respect to each criteria 132. For example, with respect to cost 134, statistical language module 162 will have a lower criteria score than directed dialogue module 164 because a statistical language model type interface 162 is typically more expensive than directed dialogue type interface 164. However, touch tone type interface 166 will have a higher criteria score than a directed dialogue interface and a service representative type interface 168 will have a lower criteria score 170 than a statistical language model 162 type user interface.

User interface scoring module 116 retrieves criteria score information 170 from user interface library 160 similar to the operation of interface scoring module 20 as described with respect to FIG. 1. User interface scoring module 116 calculates a user interface score by multiplying criteria weight 154 by criteria score 170 for each criteria 132 and for each of the plurality of user interfaces. The resulting sum of all of the criteria weights multiplied by their corresponding criteria scores 170 is equal to the interface score for each particular user interface type. User interface scoring module 116 then selects the user interface type with the highest interface score. In an alternative embodiment such as the embodiment shown in FIG. 1, a separate model such as the interface selection module 22 performs the selection of the user interface type. In some embodiments, user interface scoring module 116 may rank the user interface types according to their interface scores.

In the present embodiment, after user interface scoring module 116 selects an appropriate user interface type, persona consideration module 116 interfaces with persona library 180 to determine whether the selected user interface is appropriate for a particular call. Persona library 180 includes a number of call specific factors including age 182, gender 184, choice of words 186, pitch 188, modulation 190, and attitude of 192. For each factor persona library 180 also includes persona score of 194. In an alternative embodiment, more or fewer call specific factors may be included within persona library 180. In the present embodiment, persona consideration module 118 operates similarly to persona evaluation module 24 as shown in FIG. 1 and is primarily directed to considering the appropriateness of voice activated user interface types.

After the persona consideration module approves of the interface selection, the node is advanced to allow interaction with user 120. If the node is successfully completed, the method is repeated for the next node. If the node is not successfully completed 124, criteria evaluation module 114 reconsiders the criteria 132 contained within criteria library 130 for the particular node 112. In effect, the process is repeated. In addition, information related to handling node 112 is incorporated into feedback module 128. Feedback module 128 interacts with user interface library 160 to adjust criteria scores 170 and with criteria library 130 to adjust criteria weights 154 appropriately.

Now referring to FIG. 3, a flow diagram showing a method for selecting user interface dialogue nodes is shown. The method begins 200 by determining the appropriate criteria for the first node of a task 212. The criteria for the first node of the task are then scored 214 and a dialogue module or interface type is selected to complete the first node of the task 216.

In some embodiments (not expressly shown), an additional step may be implemented following selection step 216. This added step would preferably gather feed back information pertaining to the results of the customer's experience with the first node. For example, if the customer fails to successfully complete the first node or if there is a high background noise, this information may be considered for the next step, 218. This additional step my then be repeated after each subsequent selection step 222 and 228.

Next, a selection criteria for a second node of a particular task are determined 218. The selected criteria for the second node of the tasks are then weighed or scored 220 and an appropriate dialogue module is selected to complete the second node of the particular task 222. These steps are then repeated for each ensuing node of a task such that for the $n^{th}$ node of a particular task the appropriate criteria are determined 224 and then scored or weighed 226 to determine and select an appropriate dialogue task 228.

The present invention advantageously allows the unique advantages of particular dialogue models matched with nodes to the customer's and organization's advantage. The selection of which dialogue model is a dynamic and customizable approach that can be adapted over time based on the priorities defined by the company, user behavior, and system performance.

Although the disclosed embodiments have been described in detail, it should be understood that various changes, substitutions, and alterations can be made to the embodiments without departing from their spirit and scope.

What is claimed is:

1. An adaptable user interface selection system comprising:
   a selection module operable to receive a request for a user interface dialogue model for a dialogue node within a communication action, the selection module having a criteria evaluation module and an interface scoring module;
   a selection criteria library including a plurality of selection criteria, each selection criteria having an associated criteria weight;
   a user interface library including a plurality of user interface dialogue models, each of the plurality of user interface dialogue models having a criteria score for each of the plurality of selection criteria;
   the criteria evaluation module operable to retrieve the plurality of selection criteria and the associated weights from the selection criteria library;
   the user interface scoring module operable to retrieve the associated criteria score from the user interface library and determine an interface score for each user interface dialogue model; and
   the selection module operable to select the user interface dialogue model having the highest interface score.

2. An adaptable user interface selection system comprising:
   a selection module operable to receive a request for a user interface dialogue model for a dialogue node within a communication action;
   a selection criteria library including a plurality of selection criteria, each selection criteria having an associated criteria weight;
   a user interface library including a plurality of user interface dialogue models, each of the plurality of user interface dialogue models having a criteria score for each of the plurality of selection criteria;
   the selection module operable to communicate with the selection criteria library and the user interface library to calculate an interface score for each dialogue model and select a user interface dialogue model for the dialogue node.

3. The selection system of claim 2 wherein the selection module further comprises:
   a criteria evaluation module operable to retrieve the plurality of selection criteria and the associated weights from the selection criteria library;
   a user interface scoring module operable to retrieve the associated criteria score from the user interface library and determine an interface score for each user interface dialogue model; and
   the selection module further operable to select the user interface dialogue model having the highest interface score.

4. The selection system of claim 3 wherein the user interface scoring module determination of the interface score for each user interface dialogue model includes multiplying the associated criteria weight of each criteria with the associated criteria value.

5. The selection system of claim 2 wherein the dialogue node further comprises at least one associated variable value for adjusting the interface score.

6. The selection system of claim 5 further comprising the at least one associated variable value operable to adjust the criteria weight associated with at least one selection criteria.

7. The selection system of claim 5 further comprising the at least one associated variable value operable to adjust at least one criteria score associated with at least one user interface dialogue model.

8. The selection system of claim 2 wherein the selection criteria library includes at least two criteria selected from the group consisting of cost, customer satisfaction, automation rate, task completion rate, task complexity, confidence of outcome, time in system, list length, interface of previous node and dialogue state counter.

9. The selection system of claim 2 wherein the user interface library includes at least two user interface dialogue module selected from the group consisting of speech statistical language model/natural language understanding, speech directed dialogue, touch tone Interactive Voice Response, and service representative.

10. The selection system of claim 2 further comprising:
    a persona library including call specific factors; and
    a persona consideration module operable to evaluate the user interface dialogue module selection based upon the factors of the persona library.

11. The selection system of claim 2 further comprising a feedback module operable to automatically adjust the criteria weights and the criteria scores.

12. The selection system of claim 11 further comprising:
    the adjustment module operable to adjust the criteria weights and the criteria scores based upon at least one factor selected from the group consisting of environmental factors, customer factors, and organization factors.

13. The selection system of claim 2 further comprising an adjustment module operable to allow selective adjustment of the criteria weights and criteria scores.

14. An adaptable selection module embodied in a machine readable medium comprising:
    a criteria evaluation module operable to retrieve selection criteria and associated criteria weights from a selection criteria library;
    a user interface scoring module operable to retrieve criteria score information from a user interface library and determine an interface score for each of a plurality of user interface dialogue models; and
    a user interface dialogue selection module operable to select the user interface dialogue model having the highest interface score.

15. The adaptable selection module of claim 14 further comprising a persona selection consideration module operable to evaluate the appropriate selected user interface dialogue model.

16. The adaptable selection module of claim 15 further comprising the persona selection consideration module operable to evaluate each selection of a voice-activated type user interface dialogue model.

17. The adaptable selection module of claim 14 further comprising a feedback module operable to automatically adjust the criteria weights and the criteria scores.

18. A user interface dialogue model selection method comprising:

receiving a node of a communication action;

retrieving criteria and associated criteria weights from a criteria library;

retrieving criteria scores for a plurality of user interface dialogue models;

calculating an interface score for each of the plurality of user interface dialogue models; and selecting a user interface dialogue model based upon the interface scores.

19. The method of claim 18 further comprising automatically updating the criteria weights in the criteria library based upon factors selected from the group consisting of environmental factors, customer factors, and organization factors.

20. The method of claim 18 further comprising:

receiving at least one variable value associated with the node; and incorporating the variable value into the interface score calculation of at least one of the plurality of user interface dialogue models.

* * * * *

UNITED STATES PATENT AND TRADEMARK OFFICE
CERTIFICATE OF CORRECTION

PATENT NO. : 7,080,323 B2  Page 1 of 1
APPLICATION NO. : 10/263552
DATED : July 18, 2006
INVENTOR(S) : Benjamin A. Knott and Robert R. Bushey It is certified that error appears in the above-identified patent and that said Letters Patent is hereby corrected as shown below:

In the Claims:

Claim 9:
Col. 8, line 17 should read

--The selection system of claim 2 wherein the user interface library includes at least two user interface dialogue ~~module~~ modules selected from the group consisting of speech statistical language model/natural language understanding, speech directed dialogue, touch ~~tone~~ tone, Interactive Voice Response, and service representative.--.

Signed and Sealed this

Fifteenth Day of May, 2007

JON W. DUDAS
*Director of the United States Patent and Trademark Office*